Sept. 2, 1941.     P. J. GAYLOR     2,254,364
SELECTIVE EXTRACTION OF HYDROCARBON OILS
Filed June 9, 1938
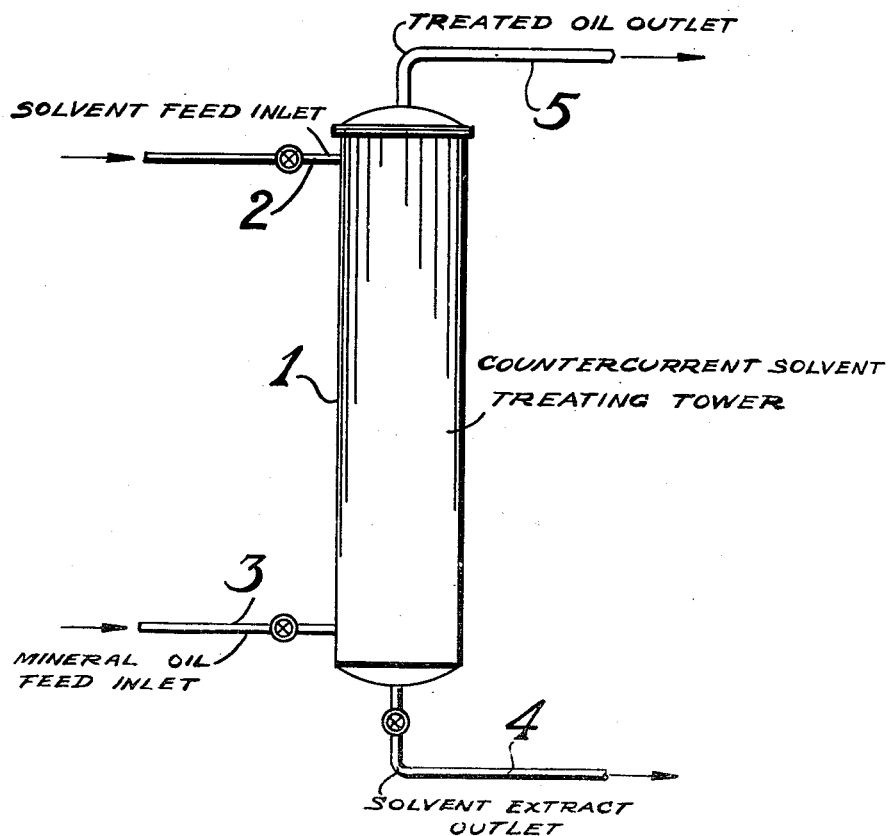

Patented Sept. 2, 1941

2,254,364

UNITED STATES PATENT OFFICE 2,254,364

SELECTIVE EXTRACTION OF HYDROCARBON OILS

Peter J. Gaylor, Staten Island, N. Y., assignor to Standard Oil Development Company, a corporation of Delaware Application June 9, 1938, Serial No. 212,623

10 Claims. (Cl. 196—13)

The present invention relates to the solvent treatment of mineral oils. The invention is particularly concerned with the treatment of petroleum oils with relatively high boiling point solvents and is especially concerned with the solvent extraction of light naphthas with a solvent selected from the class of esters of phthalic acids. This application is a continuation-in-part of my prior application Ser. No. 731,224, filed June 19, 1934, now Patent No. 2,123,642, dated July 12, 1938.

It is well known in the art to solvent treat mineral oils with various types of solvents which have the ability to segregate the relatively more cyclic fractions from the relatively more paraffinic fractions. Thus, for example, it is known to solvent treat petroleum oils with selective solvents, as for example, phenol, cresol, sulfur dioxide, nitro benzene, furfural, aniline, beta beta dichlor diethyl ether and the like. Solvents of this class have a preferential selectivity for the more cyclic type compounds as compared to the more paraffinic type compounds. Mixtures of these solvents are also used, as well as materials of the type of liquefied normally gaseous hydrocarbons, although in the latter case, as well as in the case of alcohols, the separation is effected more according to molecular weight rather than chemical structure. The solvents are intimately contacted with the oil being treated by various methods, as for example, by single or multi stage treatment under various temperature and pressure conditions. However, the preferred method is to intimately contact the solvent in a countercurrent solvent treating tower containing various contacting and distributing means at a temperature below the complete miscibility temperature of the oil and solvent.

I have now discovered an entirely new class of solvents which are particularly desirable in the solvent extraction of petroleum oils. The solvents of my invention have a preferential selectivity for the more cyclic or aromatic type compounds as compared to the more paraffinic type compounds, and are particularly desirable in the solvent treatment of lighter boiling hydrocarbons, as for example, those hydrocarbons boiling in the gas oil, kerosene, heavy and light naphtha, and gasoline boiling ranges. The solvents of my invention are high boiling point organic compounds usually liquid or preferably solid at normal temperature and pressure conditions, and are selected from the class of esters of phthalic acids, particularly from the class of aromatic esters of phthalic acids. These solvents, therefore, may readily be used in the vapor phase treatment of petroleum oils. Suitable solvents for the purpose of my invention are esters of phthalic acid, iso-phthalic acid or terephthalic acid, although preferred solvents are the aromatic esters of normal phthalic acid, as for example, diphenyl phthalate, dibenzyl phthalate, dicresyl phthalate, and the like. Other solvents, as for example, methyl benzyl phthalate, dibutyl phthalate, diamyl phthalate, or ethyl phenyl phthalate, as well as glycol esters and glycerol esters of phthalic acid may be employed. These solvents may be used alone, although it is preferred to use mixtures of the same, as for example, an equimolar mixture of diphenyl and dibenzyl phthalate. Eutectic mixtures, i. e. mixture having a minimum solidification point, of such phthalates are excellent solvents for this invention. Preferred eutectic mixtures are prepared from aromatic esters of phthalic acids, although a eutectic mixture prepared from an aromatic and an aliphatic ester of phthalic acid is also desirable.

The process of my invention may be readily understood by reference to the attached drawing showing one modification of the invention. Tower 1 is a countercurrent solvent treating tower containing suitable distributing and contacting means. Tower 1 may also be equipped to maintain any desired temperature or temperature gradual throughout the tower. The solvent or solvent mixture is introduced into tower 1 by means of solvent feed line 2. This mixture flows downwardly through the tower intimately contacting the upflowing mineral oil which is introduced into tower 1 by means of feed line 3. The solvent extract is removed from tower 1 by means of draw-off line 4 and the treated oil is removed from tower 1 by means of take-off line 5.

The temperature maintained in the solvent treating process will, of course, depend upon the particular solvent or solvent mixture being used, as well as upon the feed material being treated and the products desired. The temperature in the countercurrent treating operation of the type described, for instance, should be maintained in the range between the melting point of the solvent or solvent mixture and the temperature at which the complete miscibility between the solvent and the oil occurs. In treating lighter naphthas it is generally preferred to maintain the operating temperature relatively low in order to secure efficient operation. For this reason it is desirable to use a mixture of solvents rather than one solvent alone, since it has been found that a mixture of solvents has a lower melting point than one solvent. It is preferred to operate at atmospheric pressure, although other pressures may also be employed. The volume of solvent used per volume of oil being treated will also depend upon the particular solvent being used, as well as the oil being treated and the products desired. In general it is preferred to use from about one-half volume of solvent to four volumes of solvent per volume of oil being treated.

In order to illustrate the invention more fully, the following examples are given and should not be construed as limiting the invention in any manner whatsoever.

EXAMPLE 1

Miscibility temperatures were determined on various phthalate esters with naphthas containing various percentages of added aromatics consisting of 10% benzene, 40% toluene and 50% xylene with the following results:

TABLE 1

Miscibility temperature of an equal volume of solvent with naphtha containing

| | 0% aromatics | 10% aromatics | 20% aromatics | 30% aromatics |
|---|---|---|---|---|
| Dimethyl phthalate | 170 | 152 | 131 | 110 |
| Diethyl phthalate | 65 | 48 | 31 | 12 |
| Dibutyl phthalate | Below −40 | Below −40 | Below −40 | Below −40 |
| Benzyl phthalate | 175 | 152 | 127 | 101 |
| Diphenyl phthalate | 203 | 196 | 172 | 146 |
| Diphenyl+dibenzyl phthalate equimolar | 196 | 173 | 147 | 123 |
| Diphenyl phthalate+10% diethyl phthalate | 205 | 182 | 158 | 134 |

From the above data it may be readily seen that the phthalate esters have satisfactory miscibility temperatures and that the aromatic esters are preferable.

EXAMPLE 2

Naphthas containing 20% by volume of aromatics having the composition described in Example 1 were solvent extracted with equal volumes of various solvents. Each extraction was carried out at as low a temperature as possible without incurring the crystallization or excessive thickening of the solvent. The solvent extract layer and the raffinate layer were separated and the solvent removed from the respective layers. The results of these runs were as follows:

TABLE 2

Naphtha containing 20% of added aromatics

| Solvent | Dibenzyl phthalate | Diphenyl phthalate | Equimolar diphenyl+ dibenzyl phthalate |
|---|---|---|---|
| Temperature of extraction, ° F. | 80 | 113 | 84 |
| Extract: Yield (vol. percent on charge) | 32.7 | 29.7 | 33.0 |
| Extract: Concentration of aromatics (vol. percent on extracted oil) | 37.1 | 38.5 | 44.3 |
| Extract: Yield of extracted aromatics (vol. percent on charge) | 12.1 | 11.5 | 14.6 |
| Extract: Recovery of aromatics (vol. percent of aromatics in charge) | 60.7 | 57.3 | 73.1 |
| Raffinate: Yield (vol. percent on charge) | 56.9 | 60.0 | 70.2 |
| Raffinate: Concentration of aromatics (vol. percent on raffinate oil) | 6.4 | 7.1 | 9.8 |
| Raffinate: Yield of extracted aromatics (vol. percent on charge) | 3.8 | 4.4 | 6.9 |
| Raffinate: Residue of aromatics not extracted (vol. percent of aromatics in charge) | 18.9 | 21.9 | 34.4 |

From the above data it may be readily seen that the solvents of the present invention are particularly desirable in segregating the more aromatic type materials. It may also be seen that a mixture of the above solvents gives unexpected desirable results and that the extraction may be carried out at an unexpected low temperature.

EXAMPLE 3

A naphtha boiling in the range from 160° to 400° F. was solvent extracted with various solvents with the following results:

TABLE 3

| Solvent | Dimethyl+ diphenyl phthalate | Dibenzyl+ diphenyl phthalate |
|---|---|---|
| Temperature of extraction, ° F. | 78 | 49 |
| Extract: Yield (vol. percent on charge) | 34.9 | 30.9 |
| Concentration of aromatics | 40.7 | 45.2 |
| Bromine number (cgs. $Br^2$/gm. extracted oil) | 19.0 | 19 |
| Raffinate: Yield (vol. percent on charge) | 62.8 | 67.2 |
| Concentration of aromatics | 4.5 | 5.0 |
| Bromine number (cgs. $Br^2$/gm. raffinate oil) | 20.0 | 21 |
| Total aromatics recovered | 17.0 | 17.3 |
| Total naphtha recovered (vol. percent on charge) | 97.7 | 98.1 |

The above results further illustrate the suitability and desirability of the solvent of the present invention.

The process of the present invention may be widely varied in regard to the stocks being extracted and the conditions of carrying out the process. Naphthas containing aromatic materials and treated in accordance with the present invention give extracts possessing high solvency as indicated by the Kauri Butanol values. Gas oils may be extracted in accordance with the process of the present invention and the raffinate cracked thermally or catalytically or treated in any other desirable manner. For example, the raffinate obtained by treating kerosene distillate by the process of the present invention has excellent ring number and yields a smokeless flame. The process of the present invention is especially adapted to the production of high octane number gasolines.

The present invention is not to be limited by any theory or mode of operation, but only by the following claims in which it is desired to claim all novelty insofar as the prior art permits.

I claim:

1. Process of treating petroleum oil comprising intimately contacting a petroleum oil with a normally solid aromatic ester of a phthalic acid at a temperature below the complete miscibility temperature of the oil and the solvent but at a temperature above the point where said solvent solidifies, separating the respective raffinate and solvent extract phases and removing the solvent therefrom.

2. Process in accordance with claim 1 in which said petroleum oil normally boils in the range from 100° to 650° F.

3. Process in accordance with claim 1 in which said petroleum oil boils in the solvent naphtha boiling range.

4. Process of solvent treating a petroleum oil comprising intimately contacting said petroleum oil with a solvent selected from the class of aromatic esters of phthalic acids which at ordinary temperatures are solid under conditions to form a raffinate and a solvent extract phase, separating the respective phases and removing the solvent therefrom.

5. Process in accordance with claim 4 in which said petroleum oil boils in the gasoline range and said solvent is dibenzyl phthalate.

6. Process for the separation of mineral oils into substantially cyclic and paraffinic fractions comprising contacting the oil with a eutectic mixture of aromatic esters of phthalic acids which at ordinary temperatures are normally solid under conditions to form a solvent extract phase and a raffinate phase, separating the respective phases and removing the solvent therefrom.

7. Process for the separation of mineral oils into substantially cyclic and paraffinic fractions comprising contacting the oil with a solvent mixture comprising an alkyl ester of phthalic acid and an aryl ester of phthalic acid.

8. Process for the separation of mineral oils into their relatively more aromatic and more paraffinic fractions, comprising contacting the oil with a solvent selected from the class of aromatic esters of phthalic acids under conditions to form a solvent extract phase highly aromatic in nature.

9. Process of solvent treating a petroleum oil boiling in the motor fuel boiling range with diphenyl phthalate under conditions to form a raffinate phase and a solvent extract phase, separating the respective phases and removing the solvent therefrom.

10. Process of solvent treating a petroleum oil boiling in the motor fuel boiling range with a solvent mixture consisting of dibenzyl phthalate and diphenyl phthalate under conditions to form a raffinate phase and a solvent extract phase, separating the respective phases and removing the solvent therefrom.

PETER J. GAYLOR.